(12) United States Patent
McIllwain

(10) Patent No.: US 6,978,505 B1
(45) Date of Patent: Dec. 27, 2005

(54) FRONT LOAD WASHING MACHINE WITH A MODIFIED WASH/RINSE CYCLE RUN FOR USING LESS WATER

(76) Inventor: Jimmy Louis McIllwain, 2820 Britt Dr., Argyle, TX (US) 76226

(*) Notice: Subject to any disclaimer, the term of this patent is extended or adjusted under 35 U.S.C. 154(b) by 93 days.

(21) Appl. No.: 10/277,024

(22) Filed: Oct. 21, 2002

Related U.S. Application Data

(60) Provisional application No. 60/335,055, filed on Oct. 19, 2001.

(51) Int. Cl.[7] ............................................. D06F 21/04
(52) U.S. Cl. ........................................................ 8/159
(58) Field of Search ...................... 8/158, 159; 68/24, 68/25

(56) References Cited

U.S. PATENT DOCUMENTS

| | | | | |
|---|---|---|---|---|
| 4,526,020 A | * | 7/1985 | Fey et al. | 68/3 R |
| 4,534,188 A | * | 8/1985 | Fey | 68/3 R |
| 5,960,501 A | * | 10/1999 | Burdick | 8/158 |
| 6,241,782 B1 | * | 6/2001 | Vande Haar | 8/159 |
| 6,327,731 B2 | * | 12/2001 | Back et al. | 8/158 |
| 6,363,756 B1 | * | 4/2002 | Seagar et al. | 68/210 |

* cited by examiner

Primary Examiner—Joseph L. Perrin
(74) Attorney, Agent, or Firm—Jackson Walker, LLP

(57) ABSTRACT

Applicant discloses a front load washing machine with the wash/run cycles modified to include a single, longer than normal wash cycle which also uses more water than normal. A single, longer than normal rinse cycle is provided, which also uses more water than normal. Typically the spin cycle may be run longer than normal. The effect of running only a single wash and a single rinse cycle, even though more water than normal is used in each of those cycles is to save water over the multiple "drain and fill" cycles.

4 Claims, 2 Drawing Sheets

FRONT LOAD WASHING MACHINE WITH A MODIFIED WASH/RINSE CYCLE RUN FOR USING LESS WATER

This patent application is a conversion of and claims priority from provisional patent application Ser. No. 60/335,055 filed Oct. 19, 2001.

FIELD OF THE INVENTION

Washing machines, specifically front load washing machines with wash run cycles modified to include a single, longer than normal wash cycle with more water than normal, and a single, longer than normal, with more water than normal, rinse cycle and, typically, running the spin cycle longer than normal.

BACKGROUND OF THE INVENTION

An 18-pound front load washing machine typically uses 29 to 40 gallons of water in a standard wash run. At the 29 gallon limit, there are typically 3 "drain and fill" cycles used: 1 wash cycle and 2 rinse cycles per run. At the 40 gallon limit, there are typically 5 "drain and fill" cycles, typically 1 pre-wash, 1 wash cycle and 3 rinse cycles. Each "drain and fill" cycle in a typical 18 pound front load washing machine uses about 9.7 gallons, each wash cycle in the typical prior art front load 18 pound washing machine runs for about 4 minutes using about 9.7 gallons of water, with the rinse being about 3–4 minutes using about 9.7 gallons of total water. The total time for a wash run for most prior art, 18 pound front load washing machine are 20 to 22 minutes plus fill time. Time is typically measured from the moment the water level reaches "full" to begin the cycle, until the drain opens to begin to empty the tub at the end of the cycle.

SUMMARY OF THE INVENTION

Applicant provides for a modification to the cycles of a laundry run for a front load 18 pound washing machine, which is adaptable to other machines. Applicant modifies prior art methods and machines in providing only a single wash and a single rinse cycle (and 2 drain and fill cycles) per laundry run. Even though there are fewer cycles used, a single wash and a single rinse cycle (therefore only draining the machine twice per run), it has proven effective when the time for the wash cycle is extended typically to up to about 8 to 14 minutes and further when the amount of water used in the wash cycle and in a rinse cycle is increased from about 9.7 to about 11.0 gallons. Note that while more water may be used per cycle in the two cycles in Applicant's modified system, the total water is still less than either the 3 or 5 cycle prior art machines because there are less "drain an fill" cycles. Indeed, Applicant typically uses 22 gallons or less water, therefore, saving of between 30 and 50 percent water, while providing for effective washing. The use of more water gets rid of oversudsing quicker and may have a psychological effect on the consumer who sees more water and thinks they are getting a better wash.

Applicant has found, however, that it is not necessary to increase the amount of water to get clean laundry. Applicant's method may include tipping the entire front loading machine forward, up to about 10° or so. The purpose of this is to create an "illusion" that there is more water in the tub than there actually is. This probably does not effect the quality of the wash, but helps customer acceptance—they see through the window the water level higher than what it would be if flat, think there is more water in the machine and think they are getting a better wash. Raising the rear may be done with spacers or blocks or other suitable means. The void between the front and rear, created by raising the rear may be filled by grout, to help stabilize the machine, if needed. At least one manufacturer, Milner, tilts their machines rearward. This may lower water consumption and may relieve stress on the bearings. Some machines tilt forward to unload wash when the wash is completed, and then tilt back flat.

DETAILED DESCRIPTION OF THE PREFERRED EMBODIMENTS

Figure 1A:
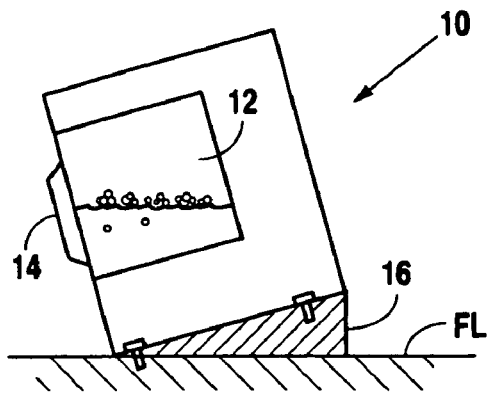
FIGS. 1A, 1B and 1C illustrate side elevational cross sectional of views of a typical front load and washing machine that is titled forward (FIGS. 1A and 1B) compared with normal horizontal mounting illustrated in FIG. 1C.

Applicants may extend by about 10 to 20 percent (typically, may be more or less) the total time for a laundry run as compared to a prior art 3 to 5 cycle wash run but use less total water. The trade off is important for conserving water. By using only a single wash and a single rinse cycle but increasing, typically (but not necessarily), the amount of water and typically the time, Applicant's have provided for an effective means of cleaning fabric while using less total water.

The method and system of reducing the cycles and increasing the water and time per wash and rinse cycle may be done with any mechanical, computer program, chip, palm pilot, PC board or fiber optic control or any other type of timing device known in the art. Programmable timers exist that may be utilized to reduce the number of cycles and increase wash and rinse time.

Household soap typically will break down in 10 to 12 minutes of wash time. The prior art, by draining a wash cycle before the soap is broken down wastes water and decreases the effectiveness of the rinse cycle. Industrial strength, high caustic soap breaks down about 14 minutes, because Applicant fills the machines only twice, they can use more water and increase the turbulence in the tub. Furthermore, by increasing the amount of water used on the rinse cycle and increasing the time, greater turbulence is created.

Prior Art
  *Typical Prior Art 5 Cycle 18# Front Load
    1. Pre-wash: 9.7 gal, 2.50 min.
    2. Wash: 9.7 gal, 4.0 min
       Spin (optional): 1.0 min
    3. Rinse: 9.7 gal, 2.50 min
       Spin: 1.0 min 4. Rinse: 9.7 gal, 2.5 min
   Spin: 1.0 min
5. Rinse: 9.7 gal, 2.5 min
   Spin: 4.0 min
Total 48.5 gal, 22.0 min+fill time
*Typical Prior Art 3 Cycle 18# Front Load
1. Wash: 9.7 gal, 3.5 min.
   Spin (optional): 1.0 min
2. Rinse: 9.7 gal, 2.0 min
   Spin: 1.0 min
3. Rinse: 9.7 gal, 2.0 min
   Spin: 4.0 min
Total 29.1 gal, 13.5 min+fill time Example #1 of Applicant's Method Applicant's 2 Cycle Method for 18# Front Load
Wash: 11.0 gal, 14.0 min
Spin: 3.0 min
Rinse: 11.0 gal, 6.0 min
Spin: 6.0 min
22 gal 29.0 min+fill time Example #2 of Applicant's Method (Showing, Typical Ranges) #18 Front Loader
Wash: 8–12 gal., 8–15 min
Spin: 2–4 min
Rinse: 8–12 gal., 4–8 min
Spin: 4–8 min
16–24 gal., 18–35 min+fill time For application to larger capacity machines scale up the time and water requirements about 80% of the multiple from 18#. For example, a 36# front loaded should be set to run at 80% of 16–30 min. wash range (see example #2) and water increase for to 80% of 16–24 gal. Wash range.

Thus Applicant provides a method for conserving water by the modification of the wash/rinse cycles of a typical prior art front load washing machine. These steps comprise: (a) eliminating all wash cycles except a single wash cycle; (b) increasing the amount of water in said single wash cycle as compared to the unmodified wash cycles; (c) increasing the run time of said single wash cycle as compared to the unmodified wash cycles; (d) eliminating all rinse cycles except a single rinse cycle; (e) increasing the water in said single rinse cycle as compared to the unmodified rinse cycles; (f) increasing the run time of said single rinse cycle as compared to the unmodified rinse cycles; and (g) eliminating all other cycles except the single wash cycle and single rinse cycle.

Figure 1B:
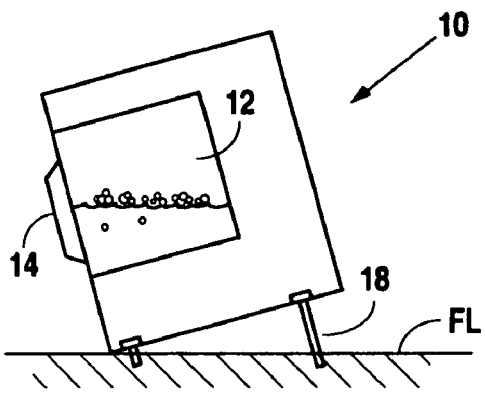
Figure 1C:
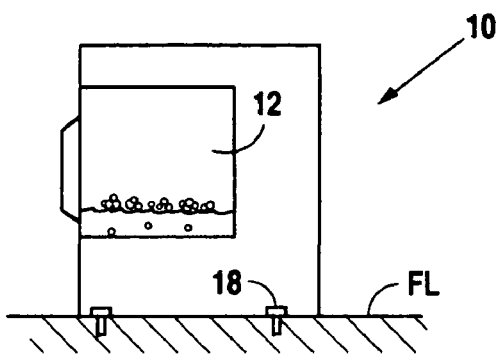

FIGS. 1A through 1C illustrate a manner of tilting a front loading washing machine (10) having a drum (12), a front door (14) with glass therein. Typically a washing machine is mounted so it is level to a floor (FL) (see FIG. 1C) or other horizontal mounting surface such as a pair of rails. However, Applicant provides a device and method for mounting the front loading washing machine (10) so it is tilted forward as in FIGS. 1A and 1B. The purpose of this is to satisfy a psychological need for the consumer—seeing a higher water level in the machine. Not only does the consumer see the water level in the machine, but sees it higher than it would ordinarily be if the machine were level with the same amount of water. There also may be an advantage to tilting it in that the forward tilt may generate more turbulence and thus better washing action than in a horizontal machine. However, a principle function of the forward tilt is to raise the "apparent" water level of the machine. If the water level is higher, the consumer thinks there is more water working on the clothes that the clothes will get cleaner.

When the customer sees more water in the door glass, less water may be used, but it would appear to the customer that the water level is high, or at least ordinarily where it should be.

A number of devices may achieve Applicant's purpose. For example, in FIG. 1A, a support wedge (16) or grout is provided to substantially fill the void created by tilting the rear of the machine. The support wedge may then be attached to the floor and the rear of the machine may be attached to the angled portion of the support wedge as illustrated.

FIG. 1B illustrates the simple expedient of raising a screw jack or other adjustable mounting bolt (18), typically a pair at the rear corners of a rectangular machine so as to provide a forward tilt to the machine. Blocks or other means may also be used to raise the rear of the machine.

Figure 2A:
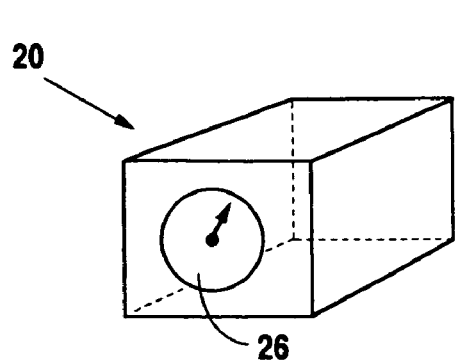
FIGS. 2A, 2B and 2C illustrate modifications to a mechanical timer wherein relays are provided to rapidly advance through pre-existing wash and/or rinse cycles and time delays are used to extend a single wash and single rinse cycle.
Figure 2B:
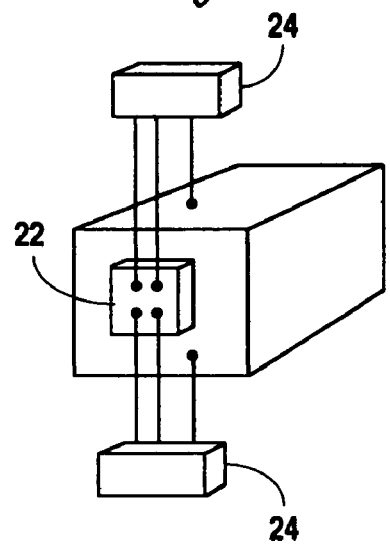
Figure 2C:
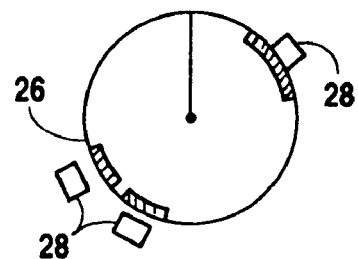

There are a number ways that pre-existing machines may be modified for cycling through some cycles and delaying others so as to achieve Applicant's single wash, single rinse cycle. For example, if the prior art machine is a 5-cycle machine (pre-wash, wash and 3 rinses), one may wish to set the machine to cycle through a pre-wash, delay the wash time and to cycle through two out of three of the rinses and delay the time for a third rinse cycle. One such way to achieve that is illustrated in FIGS. 2A through 2C. FIGS. 2A through 2C illustrate a typically mechanical timer (20) having a timer motor (22). A pair of timer delays (24) is provided. The timer typically would have a timer dial (26) to which one or more rapid advance relays (with magnetic switches) are provided. For example, in FIG. 2B, there are two time delay mechanisms wired to delay a wash cycle and a rinse cycle and, on the dial, Applicant provides for three rapid advance relays (with magnetic switches), to cycle through one of the wash cycles and two of the rinse cycles.

Figure 3A:
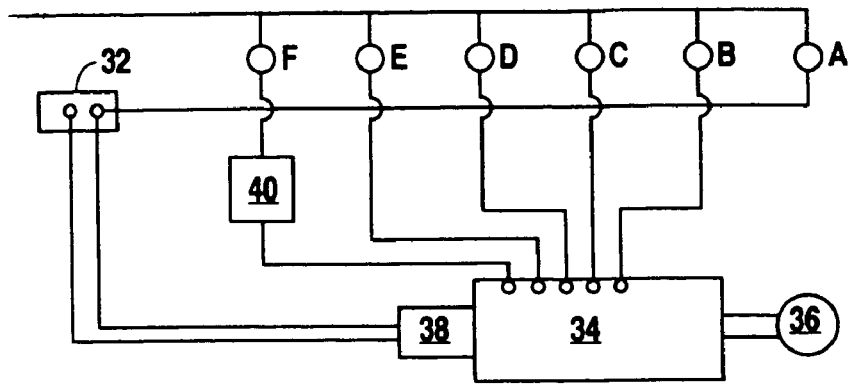
FIGS. 3A and 3B illustrate one modification on a prior art (FIG. 3A) light board wash system, using relays to eliminate cycles and time delays to extend cycles resulting in a single wash and single rinse cycles. This time is increased over typical wash or rinse cycles (again, with drain and fill cycles between the wash and rinse cycles).
Figure 3B:
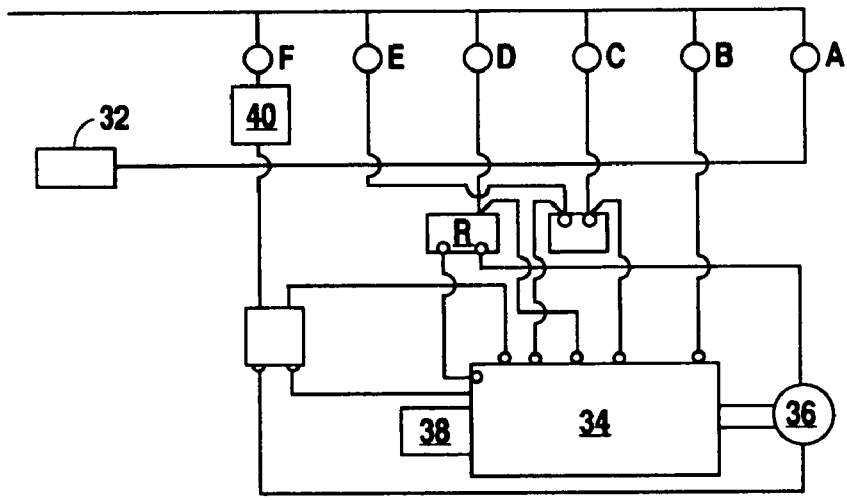

FIGS. 3A and 3B illustrate a manner of wiring a light board machine, (such as a Dexter Commercial Washer) illustrated in FIG. 3A, to achieve the same results that are achieved with the timer and relays illustrated in FIGS. 2A through 2C. FIG. 3B shows modifications to a standard five-cycle circuit illustrated in FIG. 3A. A terminal block (32) is provided that may be energized from a source of energy such as a 110 volt or 220 volt AC circuit. A timer (34) is provided that includes a master motor (36) (which controls valves for drain and fill, water levels, the motor driving the drum, etc.) and a slave motor or "rapid advance motor" (38) for driving the timer. A spin control safety device (40) may be provided that functions to keep the drum from spinning if the water leverl to high.

A to F are lights on the light board and include on/off light A, pre-wash light B, wash light C, rinse light D (for first and second rinses), final rinse E and spin light F. As is seen in FIG. 3B, a time delay is provided such that pre-wash and wash lights will go on and generate a single wash cycle that will run (time delayed) to run beyond a time of the wash cycle. Relays and time delay mechanisms will also run extend time of a final rinse cycle and the spin cycle. Adding additional water to the tub is simply a matter of recalibrating water level control for more water.

Figure 4:
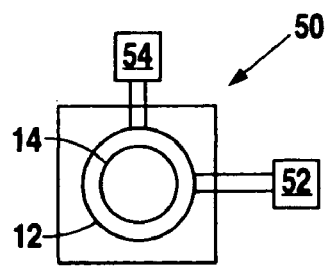
FIG. 4 illustrates a front load wash machine modified according to Applicant's present invention.

FIG. 4 illustrates a typical front load wash machine 50 having a drum 12, front door 14, typically including glass therein. The drum is driven by a typical timer and control circuit 52 and is filled with water and, typically a soap solution (those soap may be added through the front door or a soap chute) through use of a typical fluid system 54. However, simple modifications by those skilled in art may provide the fluid systems and the timer and control circuits modified to deliver only to single wash and single rinse cycle (with a drain and fill cycle and, optionally a short spin cycle there between).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method for conserving water by modifying the cycles of a conventional front load washing machine having wash and rinse cycles, the method comprising the steps of:

providing a conventional multiwash and multirinse front load washing machine, said front loading washing machine being tilted forward relative to a horizontal mounting surface;

eliminating all wash cycles except a single wash cycle;

filling said front loading washing machine with 8 to 12 gallons of water for said single wash cycle;

running said single wash cycle about 8 to 15 minutes;

eliminating all rinse cycles except a single rinse cycle;

filling said front loading washing machine with 8 to 12 gallons of water for said single rinse cycle; and running said single rinse cycle 4 to 8 minutes.

2. The method of claim 1 wherein the conventional front loading washing machine of the providing step is an 18 pound washing machine.

3. The method of claim 1 wherein the conventional front loading washing machine of the providing step is tilted forward at an angle of up to 10°.

4. The method of claim 1 wherein the conventional front loading washing machine of the providing step includes glass in a door thereof.

* * * * *